H. W. SPANG.
LIGHTNING-ROD.
No. 6,835. Reissued Jan. 4, 1876.
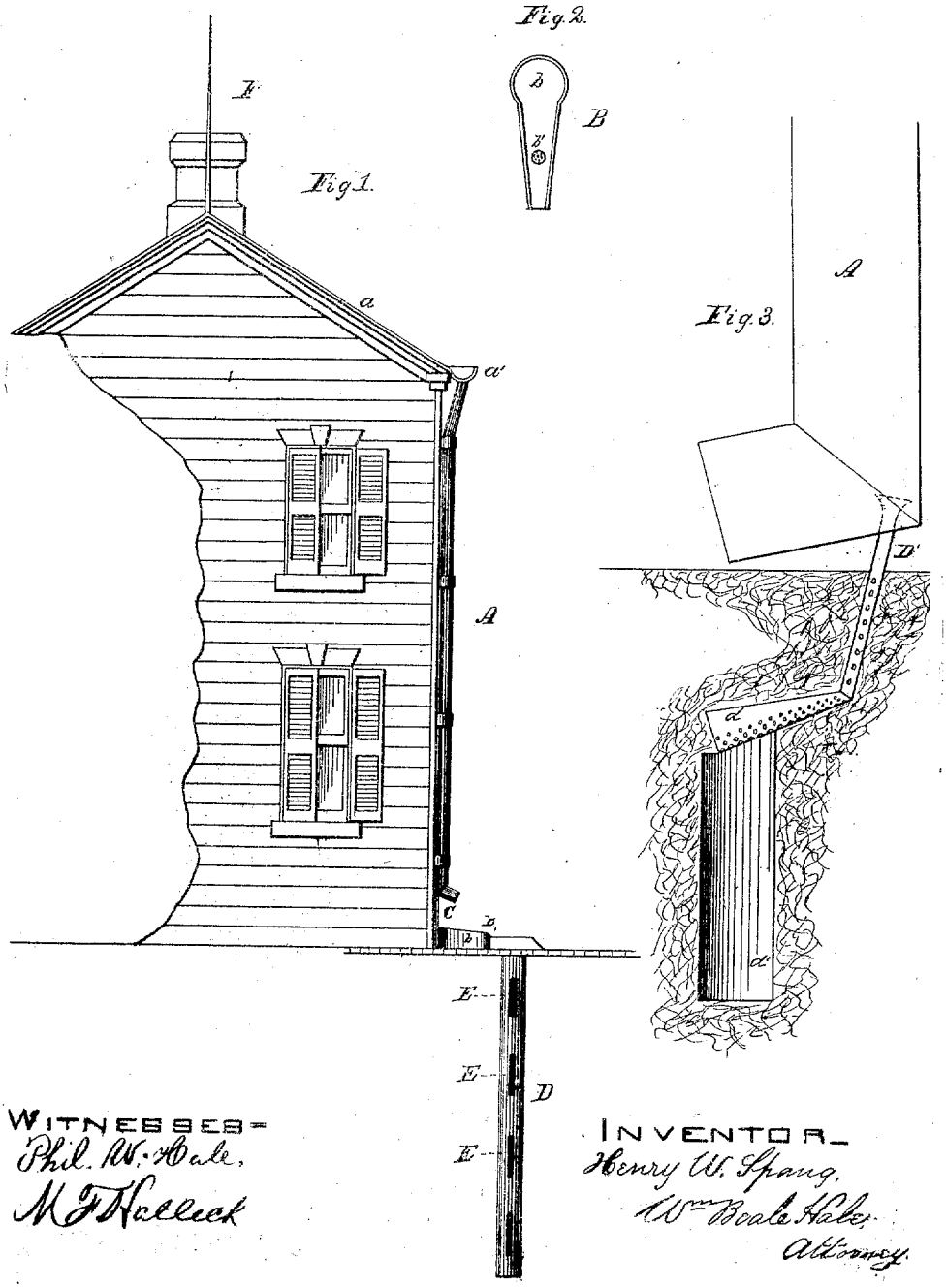
WITNESSES—
Phil. W. Hale,
M F Hallock
INVENTOR—
Henry W. Spang,
Wm Beale Hale,
Attorney.

UNITED STATES PATENT OFFICE.

HENRY W. SPANG, OF READING, PENNSYLVANIA.

IMPROVEMENT IN LIGHTNING-RODS.

Specification forming part of Letters Patent No. 167,415, dated September 7, 1875; reissue No. 6,835, dated January 4, 1876; application filed December 14, 1875.

*To all whom it may concern:*

Be it known that I, HENRY W. SPANG, of Reading, in the county of Berks and State of Pennsylvania, have invented certain new and useful Improvements in Lightning-Conductors; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention consists in connecting an ordinary metallic rain-pipe of a house or other structure with a metallic roof or other lightning attractor or conductor at its top, and with a perforated metallic pipe placed in the earth near its bottom or foot, and a suitable distance from the foundation-walls of the house, and arranged so as to form a perfect line of electrical conductors, and keep the earth surrounding the said perforated pipe, and any other terminal metallic conductor connected therewith, moist by means of rain or waste water, and thereby secure a good earth-connection therefor, and also afford means by which a portion of the attracted electricity will be diffused, during a thunder-storm, over the flowing rain-water, and into the moist surface of the earth; the said metallic rain-pipe being connected with the perforated pipe by means of a metallic drain or gutter, pipe, rod, or other suitable conductor, or directly therewith. It also consists in an improved earth-terminal for lightning conductors or rods, consisting of a metallic pipe with perforations or openings along its entire length or sides, so that the rain or waste water which enters the pipe will not only flow into the earth at the bottom, but also into the earth along the whole length of the pipe, thereby causing a larger amount of earth to be readily saturated with water, and enabling lightning or atmospheric electricity to be more readily diffused than by any other method, device, or devices heretofore employed for moistening the earth surrounding the terminal conductor and diffusing lightning.

The details of construction involved in my invention, and the operation thereof, will be fully explained in the following specification, with reference to the accompanying drawings, in which—

Figure 1 is a view in elevation of my invention. Fig. 2 is a plan view of a metallic drain or gutter. Fig. 3 shows a modification of my invention.

A is an ordinary metallic rain-pipe, connected with, and leading from, the metallic roof *a* of a house at the gutter or trough *a'* thereof. B is a metallic drain or gutter, the basin *b* of which receives the rain or waste water flowing through and from pipe A. This drain or gutter is connected to pipe A by a metallic rod, C, pipe, or other suitable metallic conductor, and near the mouth of the gutter, and in the bottom thereof, is an aperture, *b'*, at which a metallic pipe, D, having an opening at its top and bottom, and any suitable number of openings or perforations, E, of any desired form or size, along its entire length or sides, is connected to the drain or gutter B, and extends downward into the earth. The aperture *b'* in the bottom of the gutter B can be covered by a perforated disk in summer, said perforated disk allowing the passage of water into pipe D, but preventing the passage of trash, by which the pipe might become clogged. In the winter the perforated disk may be replaced by a solid one, so as to prevent the water entering pipe D and freezing, as at that season the earth is usually sufficiently moist, and there is seldom any thunder and lightning. When the house has a metallic roof, as shown at *a* in the drawing, and pipe A is connected therewith, an attracting-rod, F, which extends above the top of the chimney or other elevated projection of the house, should be erected directly upon the roof, and be metallically connected therewith; but in case the house has a wooden, slate, or other roof of poor conducting material, the lightning attractor or conductor F, which should also extend along the ridge of said roof in every direction, and along the edge of said roof at each gable, must be connected with rain-pipe A, or with the metallic eave trough or gutter, to which said pipe A is connected.

The drain or gutter B, or the pipe which may be used for conveying the water from rain-pipe A into the perforated pipe D, may be of any desired length, and may, if desired, extend into the street-gutter, or into a sewer, and the perforated pipe D may be extended from any portion of the said drain or gutter, or drain-pipe.

The perforated pipe D can be connected with rain-pipe A by means of a solid rod or bar placed on the top of the earth, or beneath the surface thereof, instead of by a gutter or pipe, as hereinbefore described, and may also be placed and arranged so that the waste-water from a pump or hydrant, or water from a gutter or stream, will also flow into the said perforated pipe D, and keep the earth about said pipe well moistened during the summer.

The pipe D can be round, square, triangular, or of any desired form, and may also have any number of perforated branches; also, an enlargement at its bottom or top, so as to hold a large quantity of water during a thunder-storm; and it can also have any other metallic terminal conductors connected therewith.

It is, however, preferable to use a straight pipe without branches, so that it can be driven downward into the earth, and the earth inside thereof be afterward taken out by means of a small auger or shovel, or be well packed in a hole made by a rod with a sharp point driven into the earth, or a hole made by an earth auger or excavator.

Instead of employing a solid iron pipe, D, round, square, or of any other suitable form, perforated with openings or holes, several curved or flat pieces or bars of iron can be used, and be fitted and held together at the top and bottom by means of metal hoops, or other suitable fastenings, so that there will be a suitable space or opening between each pair of said pieces or bars, which will allow the water to pass through and moisten the earth surrounding and beneath them, and thereby answer the same purpose as a solid iron perforated pipe, and also be convenient for causing a good contact to be made with the earth, by spreading the said pieces and pressing them tightly against the sides of a hole made by a driving-rod, an earth-auger, or excavator.

In the modification shown in Fig. 3 the perforated pipe D′ connects above ground directly with the metallic rain-pipe A, which is supposed to be in metallic connection with a lightning attractor or conductor at its top, and it has a perforated funnel or enlargement, *d*, connected therewith by an elbow-joint at the foot thereof, so as to hold a large quantity of water, and a terminal metallic plate, *d′*, is connected to and extends vertically downward from the perforated funnel or enlargement *d*, as shown. In this arrangement the perforated pipe D′ is supplied with water directly from rain-pipe A, and the said perforated pipe is near the foundation-wall of the house. I prefer, however, to have the perforated pipe placed at least six feet from the foundation-walls of the house, so as to prevent them from becoming thoroughly saturated with water. It is also advisable to make use of a gutter or drain, B, or have the upper portion of perforated pipe D or the connecting conductor placed so as to be in contact with the flowing rain-water during a thunder-storm, so that a portion of the attracted lightning will be diffused through the said flowing rain-water over the moist surface of the earth.

It is well known that in order to diffuse lightning readily into the earth and secure the proper action of lightning-conductors, it is necessary that the said conductors must terminate in, or at least come in contact with, a large and well-moist portion of the earth. Dry earth is a poor conductor, into which the atmospheric electricity does not readily flow from the terminal conductor of a metallic rod, pipe, or other lightning-conductor erected upon a house, and when said conductor does not have a suitable reservoir of well-moist earth into which to quickly and readily discharge its attracted electricity it becomes worthless as a protection, as the electricity is then apt to leave the conductor, pass into the building, and damage or destroy it, and endanger the inmates. The object, therefore, of employing the perforated pipe D and extending it downward into the earth is in order that a portion of the rain or waste water may flow into the pipe D and moisten the earth surrounding and beneath said pipe, and thereby provide a suitable reservoir of moist earth, and particularly during a thunder-storm, for the diffusion of lightning into the earth. I carry the pipe D to a distance below the surface of the earth where there is approximately permanent moisture; but as the depth to which the heat of the sun dries the earth varies during the summer, I aim to have my pipe or terminal conductor so placed that, if not actually within the line of permanent moisture, communication therewith will be very soon established after the commencement of a thunder-storm, by means of the rain-water flowing through the lower opening and perforations of pipe D.

Water is a conductor of electricity, and during a thunder-storm the greater portion of rain-water flowing from rain-pipe A passes over the drain or gutter B, or the top of perforated pipe D or connecting conductor, and spreads over the surface of the earth, or a brick or stone gutter or pavement, and reaches the earth through the interstices of the pavement, or flows into a running gutter or sewer, and the said rain-water assists in diffusing the attracted electricity from said drain or gutter B, or pipe D, or connecting conductor, over the moist surface of the earth, along the gutters, pavements, sewers, &c.

The gas-pipes in a building, or any other metallic conductor, may be used as part of the lightning-conductors, in connection with perforated pipe D, and care should be taken that a good electrical connection is made between the joints of the gas-pipes by soldering or brazing them together, or by an additional conductor, as the red lead used at the joints of such pipes is a poor conductor of electricity; and the meter must also be shunted by means of a copper sheet or wire, or other good conductor having greater conductivity than the material of the meter and the lead joints thereof, so as to prevent the meter from being damaged and the gas set on fire by the melting of the lead joints.

The pipe D, with perforations or openings E, as hereinbefore described, constitutes a much better medium for saturating the earth with water than an ordinary pipe, with the usual openings at its opposite ends, or any of the devices heretofore employed for that purpose, for the reason that the said pipe D not only saturates the earth at the bottom of the pipe, but also saturates the earth along its entire length, which is not accomplished by the ordinary pipe, or any other devices heretofore used. The said pipe D will more readily diffuse lightning and make a better earth-connection from the fact that a large amount of well-moist earth offers less resistance to the passage of electricity than a small amount of moist earth.

Having now fully described the construction and operation of my invention, I claim—

1. The combination of metallic rain-pipe A with perforated metallic pipe D, said pipes being electrically connected, as described, and forming a lightning-conductor, substantially as set forth.

2. Metallic pipe D, having perforations or openings E, as described, and for the purpose set forth.

In testimony that I claim the foregoing I have hereunto set my hand this 10th day of December, 1875.

HENRY W. SPANG.

Witnesses:

DANL. SPANG,

J. WARREN TRYON.